United States Patent [19]

Birk

[11] 4,058,396

[45] Nov. 15, 1977

[54] RECOVERY OF LEAD FROM BATTERIES

[75] Inventor: James R. Birk, San Jose, Calif.

[73] Assignee: Electric Power Research Institute, Inc., Palo Alto, Calif.

[21] Appl. No.: 744,918

[22] Filed: Nov. 26, 1976

[51] Int. Cl.$^2$ .............................................. C22B 13/00
[52] U.S. Cl. .......................................... 75/77; 204/66
[58] Field of Search ............... 75/77, 63, 78, 79, 44 S; 204/66

[56] References Cited

U.S. PATENT DOCUMENTS

| | | | |
|---|---|---|---|
| 1,804,054 | 5/1931 | Hayward | 75/77 |
| 3,777,012 | 12/1973 | Veloso | 204/66 |
| 3,940,265 | 2/1976 | Wilson | 75/77 |

*Primary Examiner*—M. J. Andrews
*Attorney, Agent, or Firm*—Townsend and Townsend

[57] ABSTRACT

Lead is recovered from batteries by contacting comminuted batteries with a molten alkali metal salt, reducing lead compounds to lead, separating molten lead from the molten salt, and transferring the molten salt and char to a combustion zone, where the salt is reheated to the desired temperature and recycled for contacting with the batteries. A portion of the alkali metal salt is withdrawn and purified, so as to maintain a relatively constant composition of the alkali metal salt.

6 Claims, No Drawings

RECOVERY OF LEAD FROM BATTERIES

BACKGROUND OF THE INVENTION

1. Field of the Invention

The substantial cost of lead and the problems of disposal of waste lead makes recovery of lead from lead batteries of significant economic importance. Prior art processes have employed introducing complete batteries into a furnace and removing the molten lead, while employing an after-burner to burn off volatile organic products from containers and separators. This process has significant deficiencies in the handling of the hydrogen-chloride which is produced from PVC separators, the thermal control and the cost of fuel. It is therefore desirable to provide a process, which would avoid the deficiencies of the prior art processes.

2. Description of the Prior Art

U.S. Pat. No. 3,708,270 describes a process for pyrolyzing carbonaceous materials by contacting waste materials with a molten alkali metal salt. U.S. Pat. No. 3,689,253 discloses separation of batteries into component parts providing a sludge containing lead sulfate, which is metathesized to lead carbonate, which is then smelted to lead. U.S. Pat. Nos. 2,826,490 and 2,966,350 disclose the use of organic materials associated with storage batteries to provide heat to melt the lead. U.S. Pat. No. 3,395,010 employs paper as a reductant to reduce lead compounds to lead.

SUMMARY OF THE INVENTION

Lead batteries, preferably comminuted, are combined with molten alkali metal carbonates at a temperature above the melting point of lead, whereby the lead is melted, lead compounds are reduced to lead and organic volatiles and char are produced. The reduction of lead compounds to elemental lead can be done with carbon-containing substances such as the char or coke, as is used in the conventional primary smelting processes or in conjunction therewith by electrolysis. The char and inorganic salts are transferred to a combustion zone, where the char is burned to provide heat to raise the temperature of the alkali metal carbonates to the desired temperature. Additional heat may be achieved by burning the organic volatiles or by adding additional carbon, for example, in the form of coke to the molten salt mixture. The alkali metal salts at the elevated temperature are then recycled for contact with the lead batteries. At least a portion of the alkali metal salts are withdrawn and salts other than carbonate removed or metathesized to carbonate. Particulates and other foreign matter are simultaneously removed from the withdrawn salt.

DESCRIPTION OF THE SPECIFIC EMBODIMENTS

In the subject invention, lead is recovered as lead metal in a molten state from lead batteries, substantially free of other contaminants. While the whole battery may be employed, preferably the battery is comminuted into small fragments generally ranging from about 0.1 inch to a few inches as the largest dimension, usually not more than about 6 inches. The battery pieces are then contacted with molten alkali metal carbonates, particularly alkali metals of atomic number 3-19-i.e. lithium, sodium and potassium, particularly sodium. The battery particles are substantially free or free of any sulfuric acid.

The amount of carbonate salts which are brought into contact with the comminuted batteries may be varied widely, the primary concern being that there is sufficient transfer of heat so as to melt the lead and decompose the organic materials, as well as being able to absorb any acids which may be formed. Normally, about 2 to about 10 parts by weight of the alkali metal carbonates will be employed per part of lead battery. Lesser amounts of the alkali metal carbonates will be required at the higher temperatures and with lower acid content.

The temperature of the mixture of alkali metal carbonate and battery fragments will be at least 350° C, more usually 500° C, generally less than 1,000° C, and preferably in the range of about 700° to 900° C. At these temperatures, there will be substantial decomposition of organic materials, to form char, hydrogen, carbon monoxide, low molecular weight organics, particularly hydrocarbons, and inorganics formed from the degradation of hetero containing organic materials, such as polyvinyl chloride. Inorganic acids, such as hydrogen chloride and sulfur based acids will react with the carbonate to form carbon dioxide and an alkali metal salt.

The volatile organic materials may be taken overhead and employed as a fuel in an after-burner to provide additional heat for heating the alkali metal salts. The lead, which has the highest density, will sink and may be drawn off in a continuous fashion. The solids, primarily char and salts, which will float on the lead surface are withdrawn and transferred to a combustion chamber, where the char is burned and the alkali metal carbonate temperature is raised to the desired level.

If desired, further reduction of lead salts may be achieved during the contacting of the lead battery fragments and alkali metal carbonates, by introducing a carbon electrode into the mixture as a cathode and using a second carbon electrode or other convenient material as an anode.

A major portion of the alkali metal carbonate stream is returned for contacting with the battery particles. A portion of the stream, generally less than 10%, more usually less than 5% and generally at least about 1% is withdrawn as a sidestream and purified so as to remove inorganic salts other than the alkali metal carbonates. In this manner, continuous build-up of inorganic salts other than the alkali metal carbonates and adventitious inorganics is prevented.

Any conventional means may be employed for purification. The molten salt and impurities can be contacted with water and filtration, precipitation, ion-exchange, or the like may be employed to remove the impurities from the dissolved salts. The water may be evaporated and the residual salt returned to the molten salt reactor. If low-melting (<450° C) molten salt mixtures are employed, direct filtration may be possible.

The subject invention provides a number of advantages over prior art processes. Excellent heat control can be achieved with rapid pyrolysis of organics. Pollution is avoided, since acids which are formed e.g. hydrogen chloride and sulfuric acid react with the carbonate to form innocuous salts. The char which results from the contact of the carbonated salt with the lead serves as a source of heat for heating the alkali metal carbonate salts. The organics and the char which result from the degradation of the battery also serve as reductants to reduce lead oxide to lead. If desired, a small amount of sulfur may be included in the molten salt to act as a catalyst for the oxidation of char.

Although the foregoing invention has been described in some detail by way of illustration and example for purposes of clarity of understanding, it will be obvious that certain changes and modifications may be practiced within the scope of the invention as limited only by the scope of the appended claims.

What is claimed is:

1. A method for isolating lead from lead storage batteries comprised of organic materials, said method comprising:

in a lead recovery zone, contacting lead batteries substantially free of acid with molten alkali metal carbonate salt at a temperature substantially in excess of 350° C for a time sufficient to degrade the organic materials to volatiles and char, wherein said char reduces lead compounds to lead and said lead is melted;

withdrawing the char and molten salt to a combustion zone;

burning the char in the presence of oxygen to raise the temperature of said molten salt to the desired temperature;

recycling said salt for contact with fresh battery in said lead recovery zone; and withdrawing a portion of said molten salt from said combustion zone for removal of impurities and returning the purified salt to the combustion zone.

2. A method according to claim 1, wherein the temperature of said molten salt upon contacting with said batteries is in the range of about 700–900° C.

3. A method according to claim 2, wherein said batteries are comminuted prior to contact with said molten salt.

4. A method according to claim 3, wherein said salt is sodium carbonate.

5. A method according to claim 1, wherein lead compounds are reduced to lead by electrolysis.

6. A method according to claim 1, wherein coke, coal, or other carbon-containing substance is added to said molten salt as a source of additional fuel or reducing agent for the lead compounds.

* * * * *